(No Model.) 2 Sheets—Sheet 1.
A. HERZOG.
PHOTOGRAPHIC CAMERA.
No. 295,638. Patented Mar. 25, 1884.
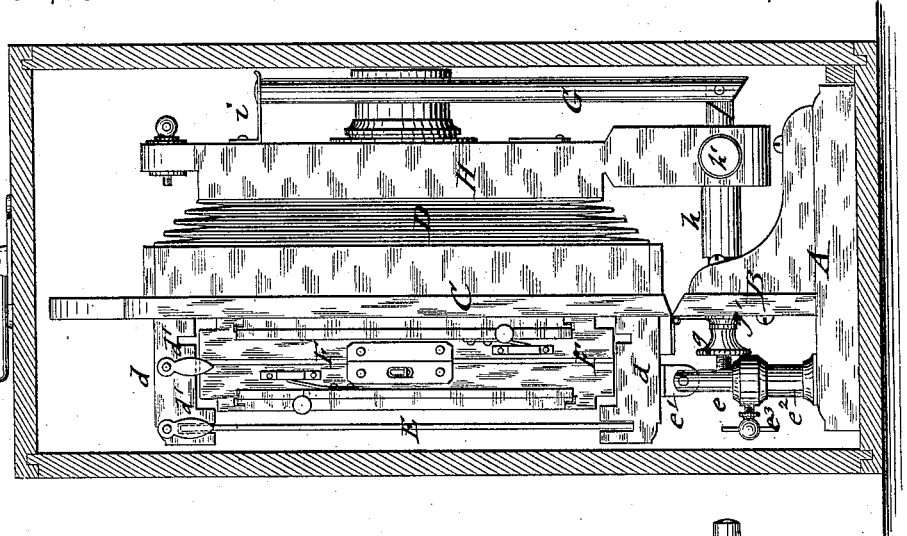
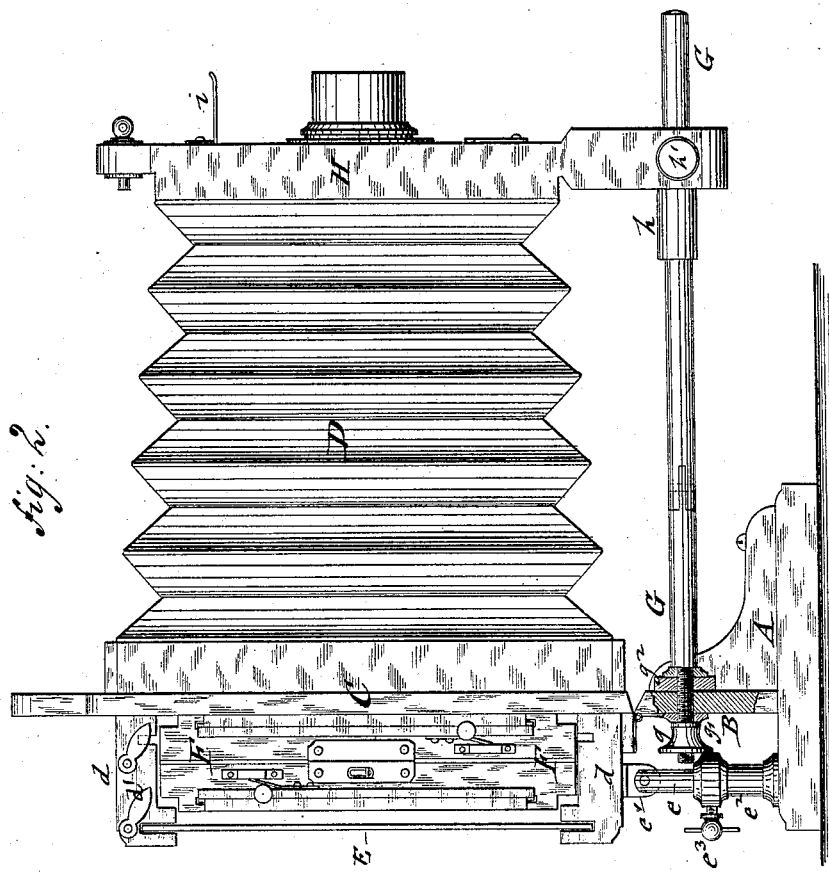
WITNESSES:
A. Schehl
Carl Karp
INVENTOR
August Herzog
BY Goepel & Raegener
ATTORNEYS.
N. PETERS, Photo-Lithographer, Washington, D. C.

(No Model.) 2 Sheets—Sheet 2.
A. HERZOG.
PHOTOGRAPHIC CAMERA.
No. 295,638. Patented Mar. 25, 1884.
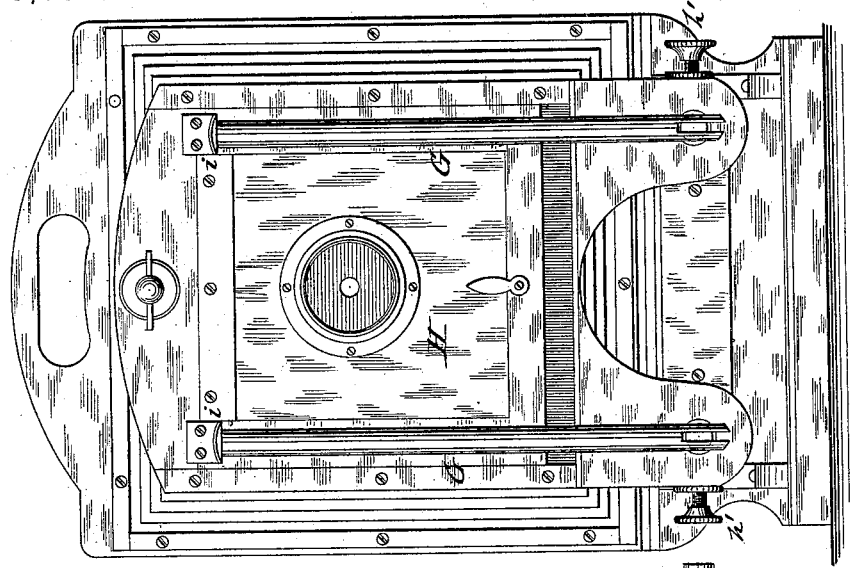
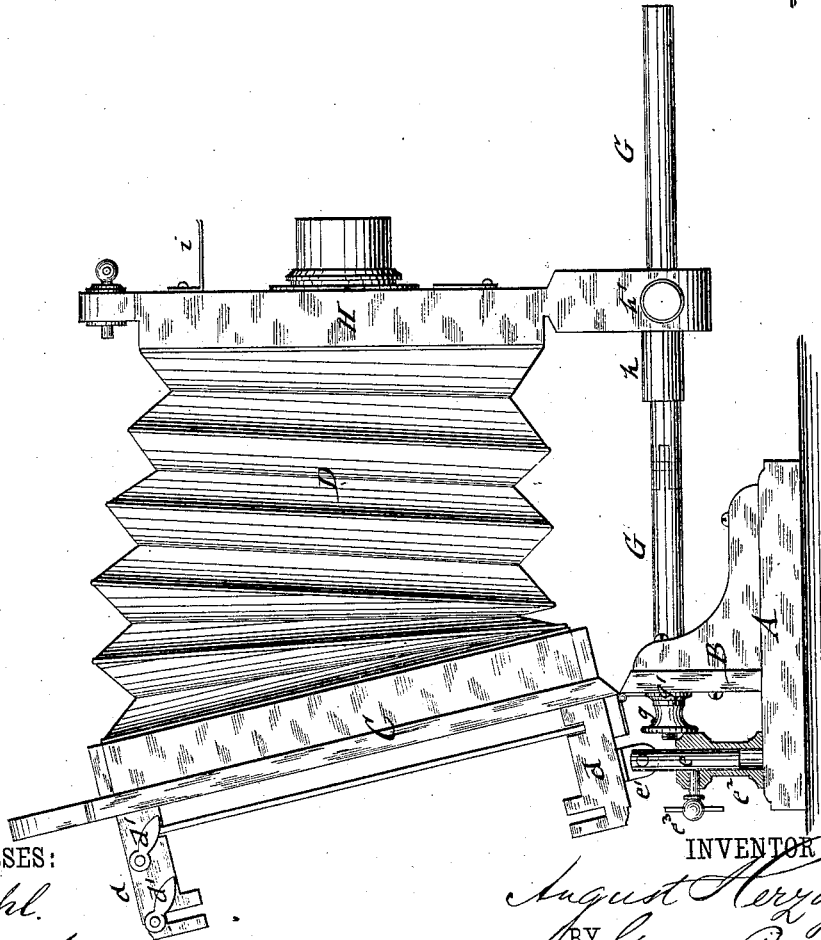
WITNESSES:
A. Schehl.
Carl Hay
INVENTOR
August Herzog
BY Goepel & Riegner
ATTORNEYS
N. PETERS. Photo-Lithographer, Washington, D. C.

UNITED STATES PATENT OFFICE.

AUGUST HERZOG, OF GUTTENBERG, NEW JERSEY.

PHOTOGRAPHIC CAMERA.

SPECIFICATION forming part of Letters Patent No. 295,638, dated March 25, 1884.

Application filed November 2, 1883. (No model.)

*To all whom it may concern:*

Be it known that I, AUGUST HERZOG, of Guttenberg, Hudson county, and State of New Jersey, have invented certain new and useful Improvements in Photographic Cameras, of which the following is a specification.

This invention has reference to an improved portable photographic camera for amateurs, which can be folded up into narrow space and used with great convenience; and the invention consists of a supporting base-frame that is applied to a tripod and provided with horizontal and axially-turning guide-rods, along which the lens-carrying frame is adjusted and secured by suitable sleeves and set-screws. The guide-rods are jointed by a hinge-connection, the shorter portions being applied to the base-frame. The rear frame of the camera is hinged to the base-frame, and provided with grooved transverse guide-strips for the plate-holder and ground glass. A pivoted plunger of the hinged rear frame is guided in a fixed socket of the base-frame, and secured by a set-screw, so as to adjust the rear frame to any desired inclination. When the bellows-shaped part of the camera and the lens-carrying frame is folded up against the rear frame, the outer longer part of the jointed guide-rods is swung up into vertical position and retained by suitable retaining devices of the lens-carrying frame, whereby the camera can be stowed away into a smaller compass.

In the accompanying drawings, Figure 1 represents a side elevation of my improved photographic camera, shown as folded up and stowed away in its portable case. Fig. 2 is a side elevation of the same, partly in section, shown drawn out for use. Fig. 3 is an end view of the camera as folded up; and Fig. 4 is a side elevation of the camera, partly in section, showing the rear frame adjusted to a backward inclination.

Similar letters of reference indicate corresponding parts.

A in the drawings represents the base of my improved photographic camera, which is applied in the usual manner to a tripod or other suitable support. On the base A is arranged a short upright standard, B, to which the rear frame, C, of the camera D is hinged. The rear frame, C, is provided with grooved transverse top and bottom strips, $d\,d$, for the ground glass E and double plate holder F. The strips $d\,d$ are further provided at the ends with pivoted catches $d'$, or with other equivalent means for securing the ground glass and plate-holder against lateral displacement. For the plate-holder I prefer to use the construction shown in the patent for plate-holders granted to me heretofore, No. 248,175, dated October 11, 1881. The hinged rear frame, C, is capable of adjustment to different degrees of inclination on the upright standard B by means of a rod, $e$, that is pivoted to a lug, $e'$, of the bottom strip $d$. The rod $e$ slides in a fixed cylindrical socket, $e^2$, of the base A, and is clamped thereto by a set-screw, $e^3$. By this means the rear frame can be turned on its hinge-connection with the base-frame, and set to any degree of inclination required by the picture to be taken.

To the upright standard B are applied horizontal guide-rods G in such a manner that they can be readily turned on their axis. For this purpose the threaded ends of the rods G are made of a smaller diameter, and passed through holes of the standard B.

To the projecting ends of the rods G are applied clamping screw-nuts $g$, and washers $g'$ at one side and washers $g^2$ at the other side of the standard B, as shown in Fig. 2. Each guide-rod G is made of two sections—a shorter one, which is applied to the standard B, and which is about equal in length with that part of the base A extending in front of the standard B, and of a longer section, that is centrally recessed and hinged to the outer end of the shorter section, which end is fitted into the central recess of the longer section, as shown in Figs. 1 and 2. The guide-rods G serve for guiding the lens-carrying frame H in forward or backward direction by means of bottom sleeves, $h$, and clamp-screws $h'$. When it is desired to extend the camera, the longer sections of the guide-rods are thrown down into horizontal position into line with the shorter sections. The guide-rods G are then turned on their axes, so that the hinge-connection of their sections is in a horizontal position, as shown in Figs. 2 and 4, whereby the longer rod-sections are prevented from swinging vertically, and form a rigid support for the lens-carrying frame. When it is desired to stow away the camera in the box, the lens-carrying frame H and the bellows-shaped part of the camera are folded up against the rear frame, C, after which the guide-rods are turned on their axes until the hinge-joints of the rod-sections permit the swinging up of the longer sections into upright position, as shown in Figs. 1 and 3. In this position the longer rod-sections are retained by bent and perforated horizontal spring-catches *i* or other suitable means, that engage the ends of the rods G and hold them in upright position, as shown in Figs. 1 and 3. In this manner the camera takes up a small space, and can be conveniently stowed away in a box in which it is carried.

The advantages of my improved camera are that the adjustment of the camera is accomplished in front of the rear frame, and not back of the same, as heretofore, and that the solid backwardly-extending base, having guideways for the movable rear frame of the camera, is entirely done away with. The operator may thereby get close to the ground focusing-glass without being inconvenienced by the backwardly-extending base that presses against his chest. Another advantage is that the apparatus takes up but little room when folded up, and supports the camera, plate-holder, and ground glass in a very compact and handy state.

Having thus described my invention, I claim as new and desire to secure by Letters Patent—

1. The combination of a supporting base-frame having forward-extending guide-rods, a rear frame hinged to the base-frame, means for adjusting the rear frame to the proper inclination on the base-frame, an extensible camera, a lens-carrying frame, and means whereby the lens-carrying frame can be adjusted on the guide-rods, substantially as set forth.

2. In a photographic camera, the combination of a supporting base-frame, a rear frame having means for supporting the ground glass and plate-holder, said rear frame being hinged to the base-frame, a camera in front of the rear frame, a plunger pivoted to the rear frame, a fixed cylindrical socket of the base-frame for guiding the plunger, and a clamping-screw for fastening the plunger to the socket, substantially as specified.

3. In a photographic camera, the combination of a supporting base-frame, a rear frame having means for supporting the ground glass and plate-holder, horizontal guide-rods made of two hinged sections, the shorter of which is applied to the base-frame, an extensible camera having lens-carrying frame, and means whereby the lens-carrying frame is secured to the guide-rods, substantially as and for the purpose set forth.

4. In a photographic camera, the combination of a supporting base-frame, a rear frame having means for supporting the plate-holder and ground glass, horizontal guide-sections made of two hinged sections, the shorter of which is applied to the base-frame, an extensible camera having a movable lens-carrying frame, means for guiding the latter on the guide-rods, and means for retaining the longer rod-section in upright position on the lens-carrying frame, substantially as set forth.

In testimony that I claim the foregoing as my invention I have signed my name in presence of two subscribing witnesses.

AUGUST HERZOG.

Witnesses:
OTTO RISCH,
SIDNEY MANN.